UNITED STATES PATENT OFFICE.

GEORG RUPPRECHT, OF HAMBURG, GERMANY, ASSIGNOR, BY MESNE ASSIGNMENTS, TO THE CHEMICAL FOUNDATION, INC., A CORPORATION OF DELAWARE.

PROCESS FOR MAKING ENAMELS.

1,360,585. Specification of Letters Patent. Patented Nov. 30, 1920.

No Drawing. Application filed June 4, 1917. Serial No. 172,791.

*To all whom it may concern:*

Be it known that I, Dr. GEORG RUPPRECHT, metallurgical chemist, subject of Prussia, residing at Hamburg, Germany, Richardstrasse 57, have invented certain new and useful Improvements in Processes for Making Enamels, of which the following is a specification.

My invention refers to enamels and more especially to such enamels as contain zinc orthosilicate. The object of my invention is an improved process for making such enamels of superior purity.

In order to be able to use enamels of this kind in the different branches, the prime condition is that their chemical composition shall not be altered in the least either by the crucible material or by other substances which might get mixed with them by chance during the melting operation. After being once finished these enamels must correspond exactly to the predetermined composition.

Now it is well known that zinc orthosilicate, when heated to the melting point, will attack all known crucible materials to a degree which renders it impossible to obtain an enamel free of impurities. The use of platinum crucibles in making such enamels, besides being uneconomical for the manufacture of such compounds on a big scale, is practically out of question for the reason that if greater quantities are melted in a platinum crucible, this latter will melt through as soon as the melting temperature has been reached.

It is true that Traube has proposed making zinc orthosilicate in a platinum crucible, but in following his method the substances forming the compounds of the silicate are dissolved in a molten state in eight times their quantity of boric acid, the silicate then being left behind. It is clear that such a method does not lend itself to the manufacture of zinc orthosilicate on a commercial scale for many technical and economical reasons, the more so as Traube's process requires a very prolonged heat treatment in the porcelain furnace. On the other hand according to my experience a simple melting together of the components cannot be carried through with more than minute quantities.

I have now ascertained that the only means for producing such enamels without altering their predetermined chemical composition is to melt the ready mixture without bringing it in contact with any foreign substance while hot, the melting temperature being produced by aid of a flame which is unable by itself to alter the composition of the mixture.

In the preferred form of my process the mixture of the components of the enamel in the form of small pieces is melted down by aid of the oxyhydrogen blow pipe. In practising this method I prefer forming rods from the mass either in a dry or wet state, these rods being then melted to drops in the flame of the oxyhydrogen blow pipe, which drops are caught in a suitable way, preferably on a layer formed from the original mixture. It is possible in this way to manufacture such sensitive enamels in the most perfect manner without in the least altering their chemical composition and without any admixture of foreign substances.

In practising my invention I may, for instance, mix zinc oxid and silicic acid in a proportion corresponding to the composition of the orthosilicate, water being added to the mixture, which is then converted into a thick paste. From this paste rods are formed in a suitable way and, after drying these rods, they are melted in the flame of an oxyhydrogen blow pipe and the drops are allowed to settle on a plate covered with some of the original mixture.

I may as well proceed in such a way that the flame of the oxyhydrogen blow pipe is directed onto the mixture to be melted, either accumulated on a suitable support or contained in a vessel. Melting is carried only to a point where the molten material has not yet come in contact with the support or with the wall of the vessel, but is permanently insulated from the support or vessel by some of the original mixture.

I claim:—

1. The process for making enamels which consists in subjecting the raw materials to the direct action of a flame developing a high temperature under conditions which prevent the material melted thereby from coming in contact with foreign substances and supporting the molten material upon an unmolten mass of said raw materials.

2. The process for making enamels which consists in subjecting the raw materials on a suitable support to the direct action of a flame developing a high temperature under conditions which leave an unmolten layer of said raw materials between the molten substances and their support.

3. The process for making enamels which consists in subjecting the mixture of the raw materials contained in a suitable vessel to the direct action of a flame developing a high temperature and carrying the melting only so far that an unmolten layer of the mixture still remains between the molten substance and the walls of the vessel.

4. The process for making enamels which consists in subjecting the raw materials to the direct action of a non-contaminating flame developing a high temperature under conditions which prevent the material melted thereby from coming in contact with foreign substances and supporting the molten material upon an unmolten mass of said raw materials.

5. The process for making enamels which consists in subjecting the raw materials on a suitable support to the direct action of a non-contaminating flame developing a high temperature under conditions which leave an unmolten layer of said raw materials between the molten substances and their support.

6. The process for making enamels which consists in subjecting the mixture of the raw materials contained in a suitable vessel to the direct action of a non-contaminating flame developing a high temperature and carrying the melting only so far that an unmolten layer of the mixture still remains between the molten substance and the walls of the vessel.

7. The process for making enamels which consists in subjecting the raw materials to the direct action of an oxy-hydrogen flame developing a high temperature under conditions which prevent the material melted thereby from coming in contact with foreign substances and supporting the molten material upon an unmolten mass of said raw materials.

8. The process for making enamels which consists in subjecting the raw materials on a suitable support to the direct action of an oxy-hydrogen flame developing a high temperature under conditions which leave an unmolten layer of said raw materials between the molten substances and their support.

9. The process for making enamels which consists in subjecting the mixture of the raw materials contained in a suitable vessel to the direct action of an oxy-hydrogen flame developing a high temperature and carrying the melting only so far that an unmolten layer of the mixture still remains between the molten substance and the walls of the vessel.

In testimony whereof I affix my signature in presence of two witnesses.

Dr. GEORG RUPPRECHT.

Witnesses:
  Fr. Hiller,
  E. Claus.